(No Model.)  8 Sheets—Sheet 1.

J. T. VARNEY.
MACHINE FOR FORGING TOE CALKS.

No. 574,504. Patented Jan. 5, 1897.

WITNESSES
INVENTOR (No Model.) 8 Sheets—Sheet 3.
J. T. VARNEY.
MACHINE FOR FORGING TOE CALKS.

No. 574,504. Patented Jan. 5, 1897.

Witnesses
Frank G. Parker
Eva A. Guild

Inventor
Joseph T. Varney
by Geo. D. G. Grau
his Attorney (No Model.) 8 Sheets—Sheet 4.
J. T. VARNEY.
MACHINE FOR FORGING TOE CALKS.

No. 574,504. Patented Jan. 5, 1897.

WITNESSES
Frank G. Parker
Eva A. Guild

INVENTOR
Joseph T. Varney (No Model.)  8 Sheets—Sheet 5.

J. T. VARNEY.
MACHINE FOR FORGING TOE CALKS.

No. 574,504. Patented Jan. 5, 1897.

WITNESSES.  INVENTOR.

(No Model.) 8 Sheets—Sheet 6.
J. T. VARNEY.
MACHINE FOR FORGING TOE CALKS.

No. 574,504. Patented Jan. 5, 1897.

WITNESSES
Frank G. Parker
Eva A. Guild

INVENTOR
Joseph T. Varney
by Wm. O. G. ...
his Attorney

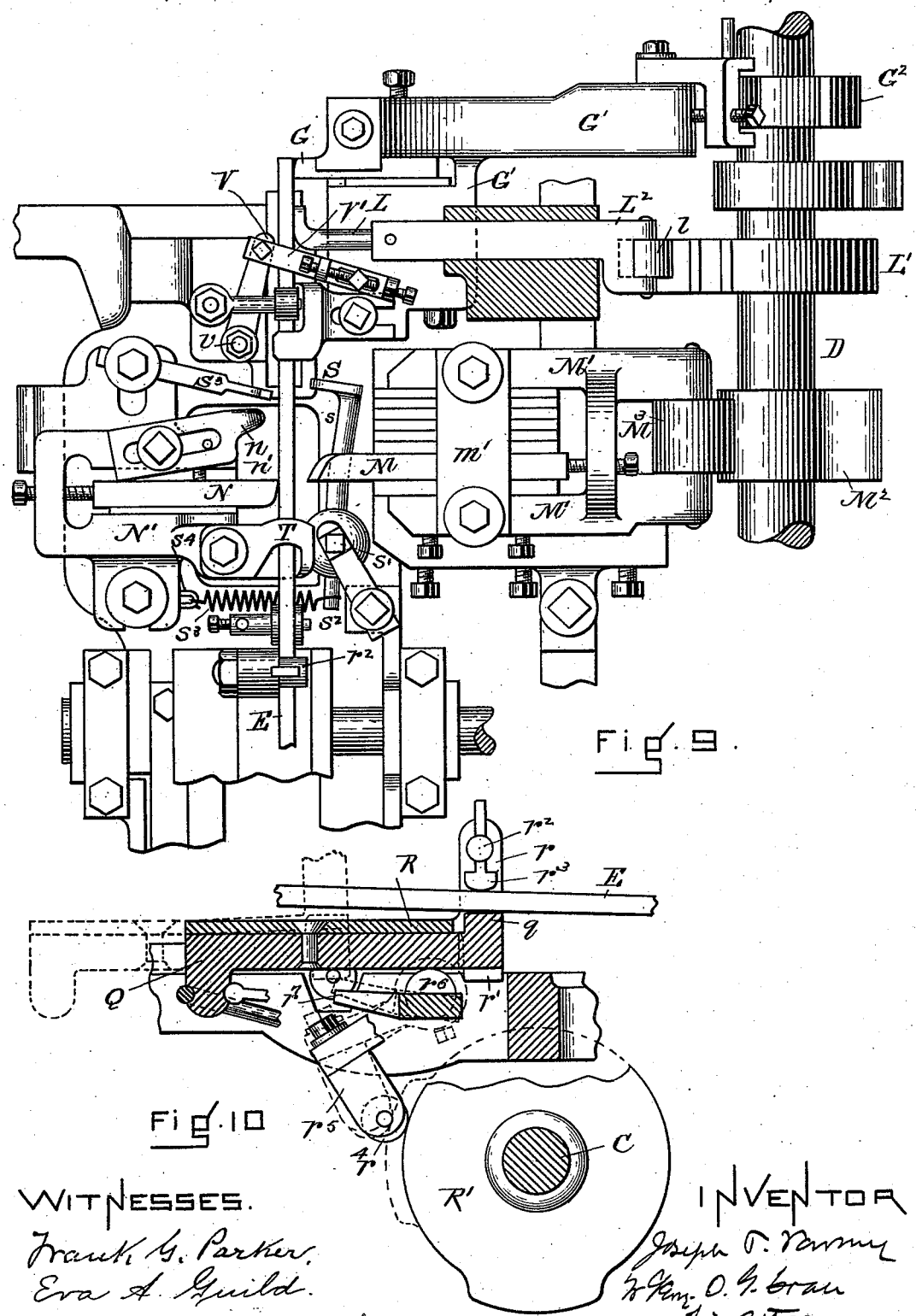

(No Model.)  8 Sheets—Sheet 8.

J. T. VARNEY.
MACHINE FOR FORGING TOE CALKS.

No. 574,504. Patented Jan. 5, 1897.

WITNESSES
INVENTOR

UNITED STATES PATENT OFFICE.

JOSEPH T. VARNEY, OF CAMBRIDGE, MASSACHUSETTS, ASSIGNOR TO THE UNION TOE-CALK COMPANY, OF PORTLAND, MAINE.

MACHINE FOR FORGING TOE-CALKS.

SPECIFICATION forming part of Letters Patent No. 574,504, dated January 5, 1897.

Application filed March 23, 1895. Serial No. 542,926. (No model.)

*To all whom it may concern:*

Be it known that I, JOSEPH T. VARNEY, of Cambridge, in the county of Middlesex and State of Massachusetts, have invented a new and useful Improvement in Machines for Forging Toe-Calks, of which the following is a specification, reference being had to the accompanying drawings, forming a part hereof.

The purpose of my invention is to construct a machine which shall forge a toe-calk as good as, if not better than, toe-calks forged by hand.

Toe-calks have been constructed heretofore by machinery; but they have been faulty in that they had fins projecting from one or more of their sides, in which case they required further treatment, or in that the point was imperfect, (the points, for example, of different toe-calks made during the same run being of different lengths,) or were imperfect in some other way.

My invention is intended to remedy all these difficulties, and the embodiment of my invention herein described is so constructed that its product will be satisfactory in every respect.

My invention will be understood by reference to the drawings, in which—

Figure 1:
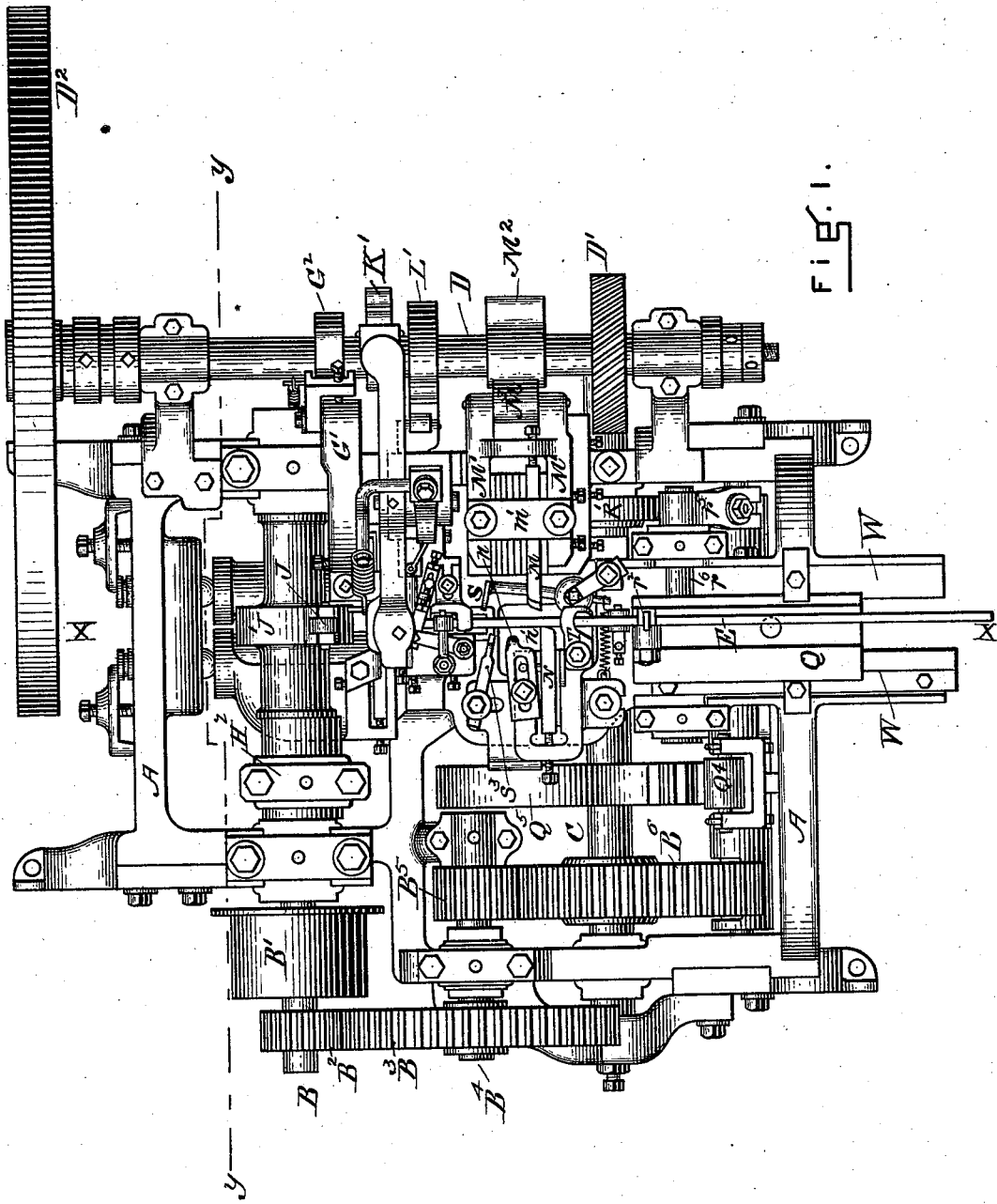
Figure 2:
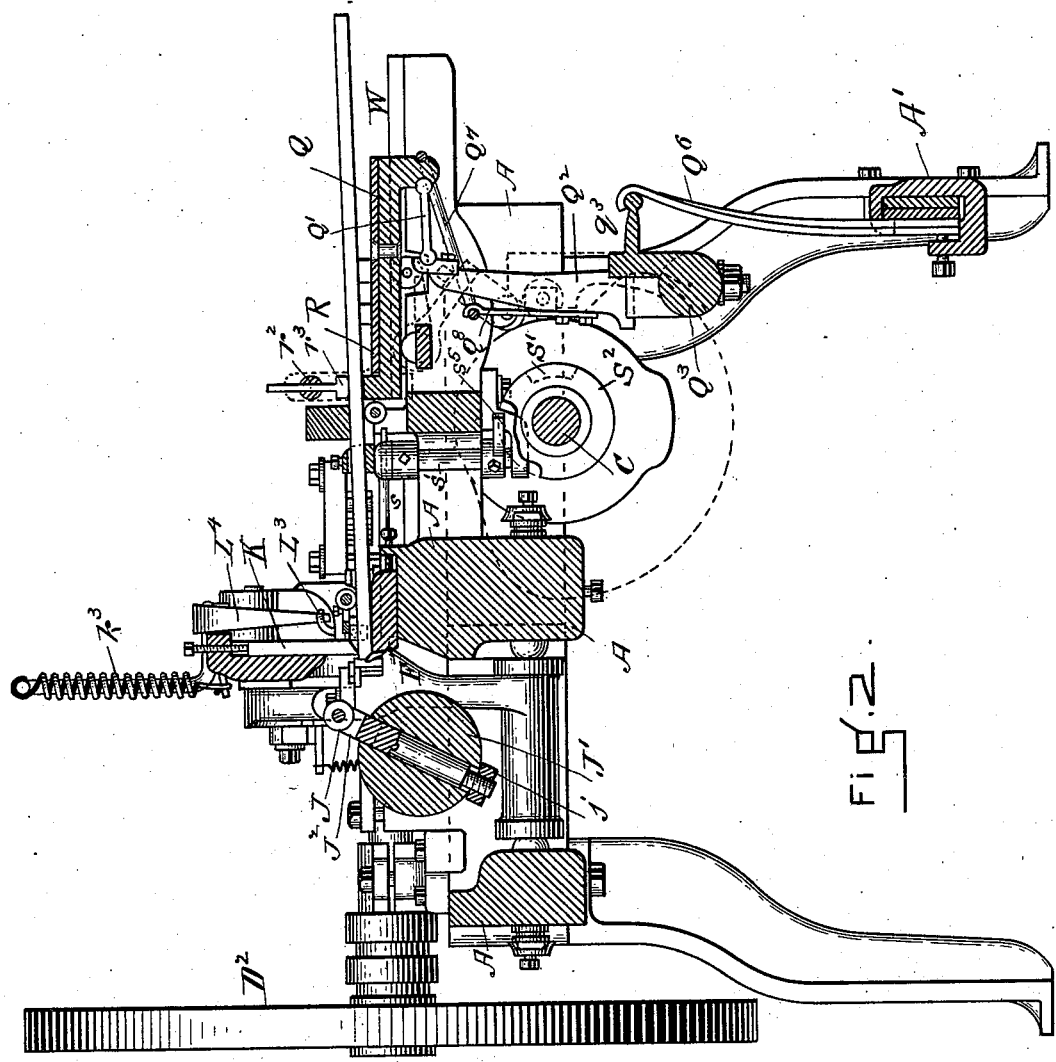
Figure 3:
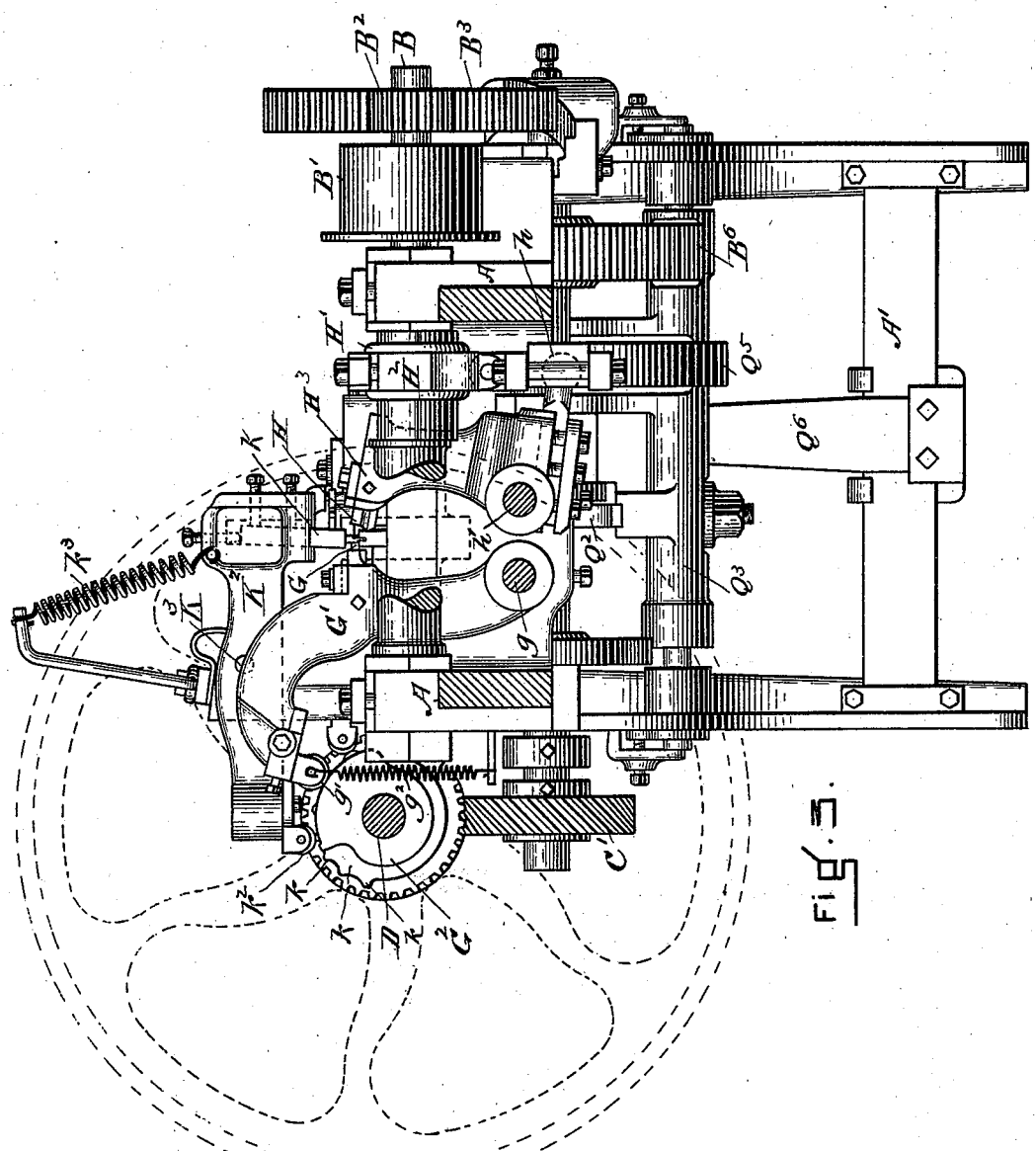
Figure 4:
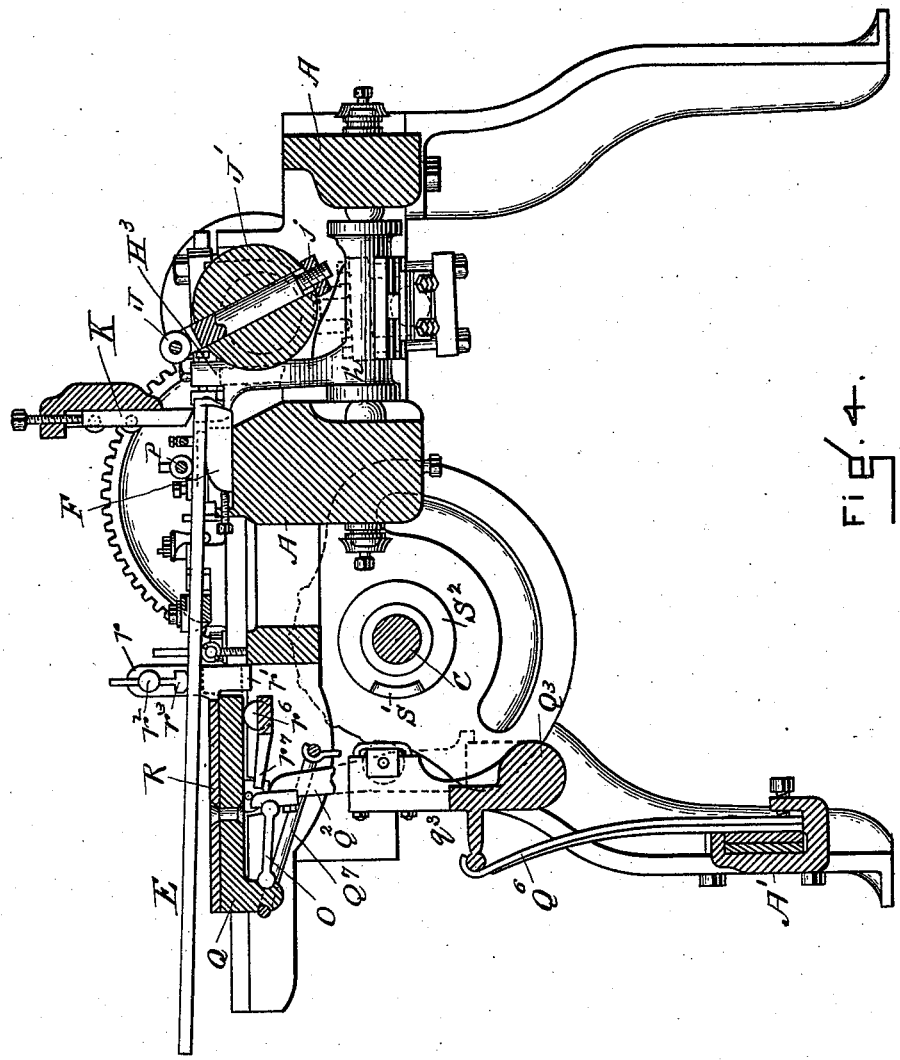
Figure 5:
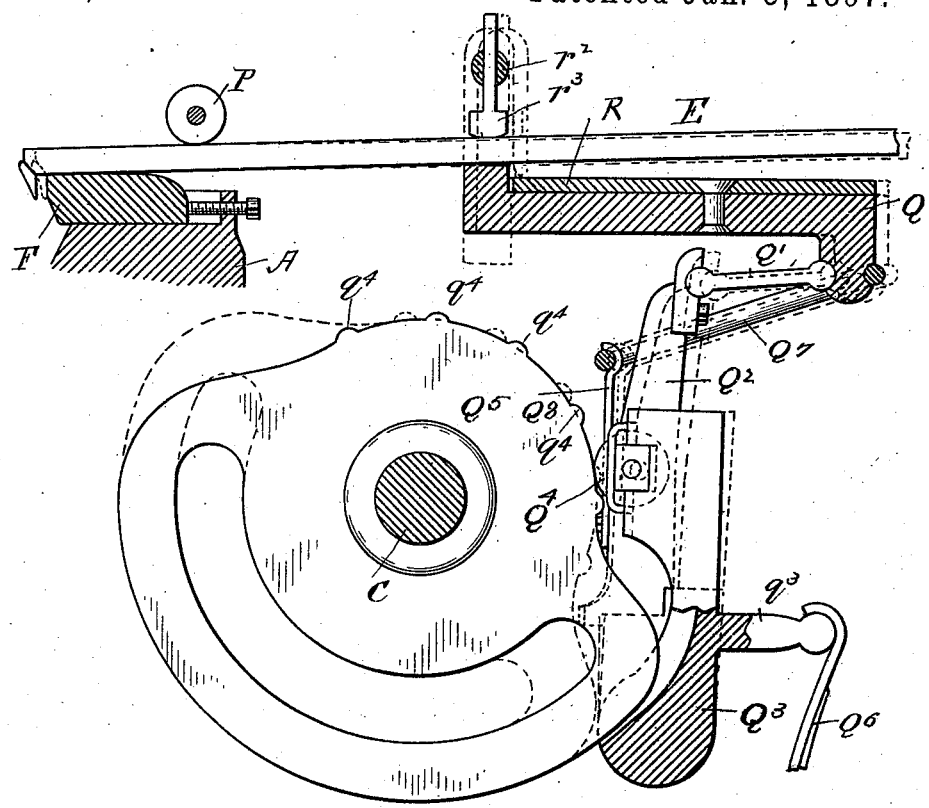
Figure 6:
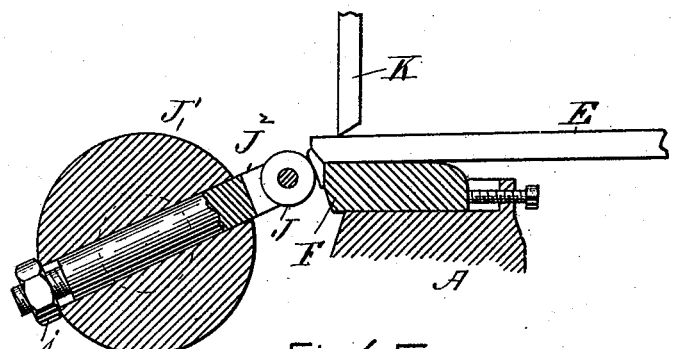
Figure 7:
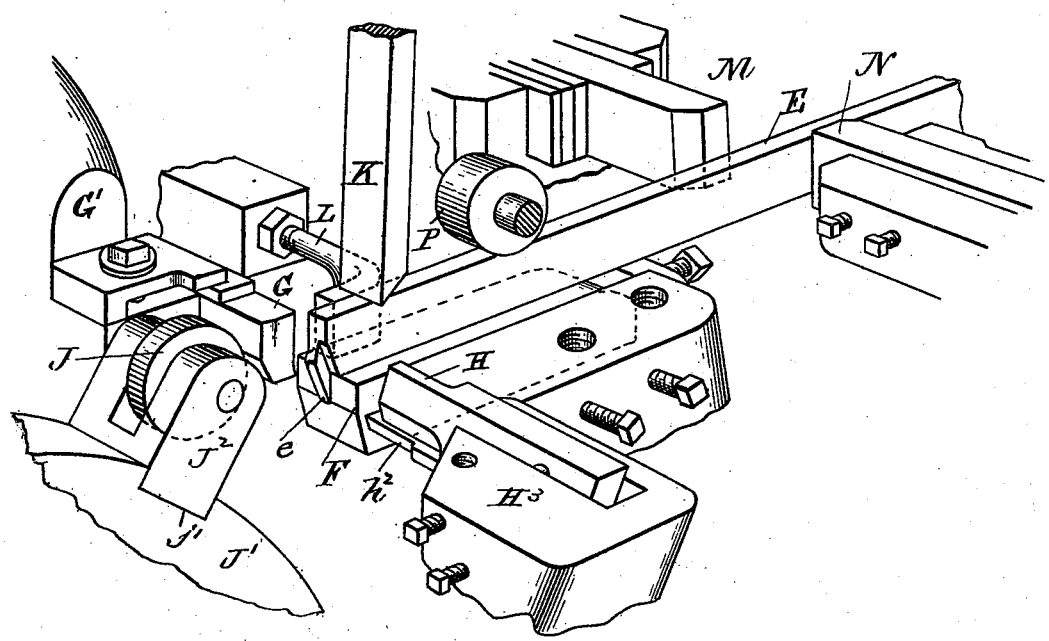
Figure 8:
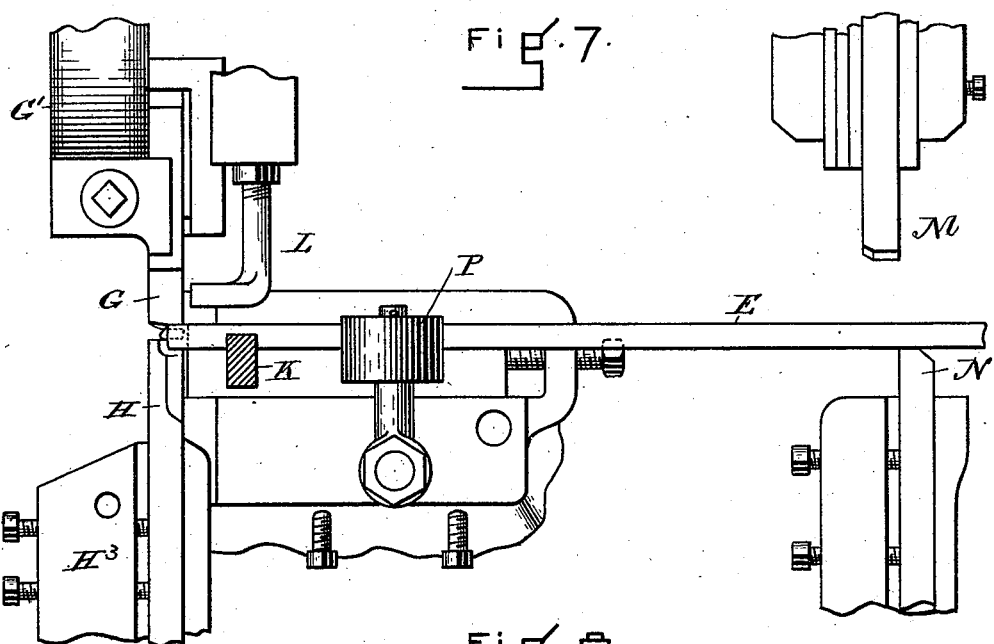
Figure 11:
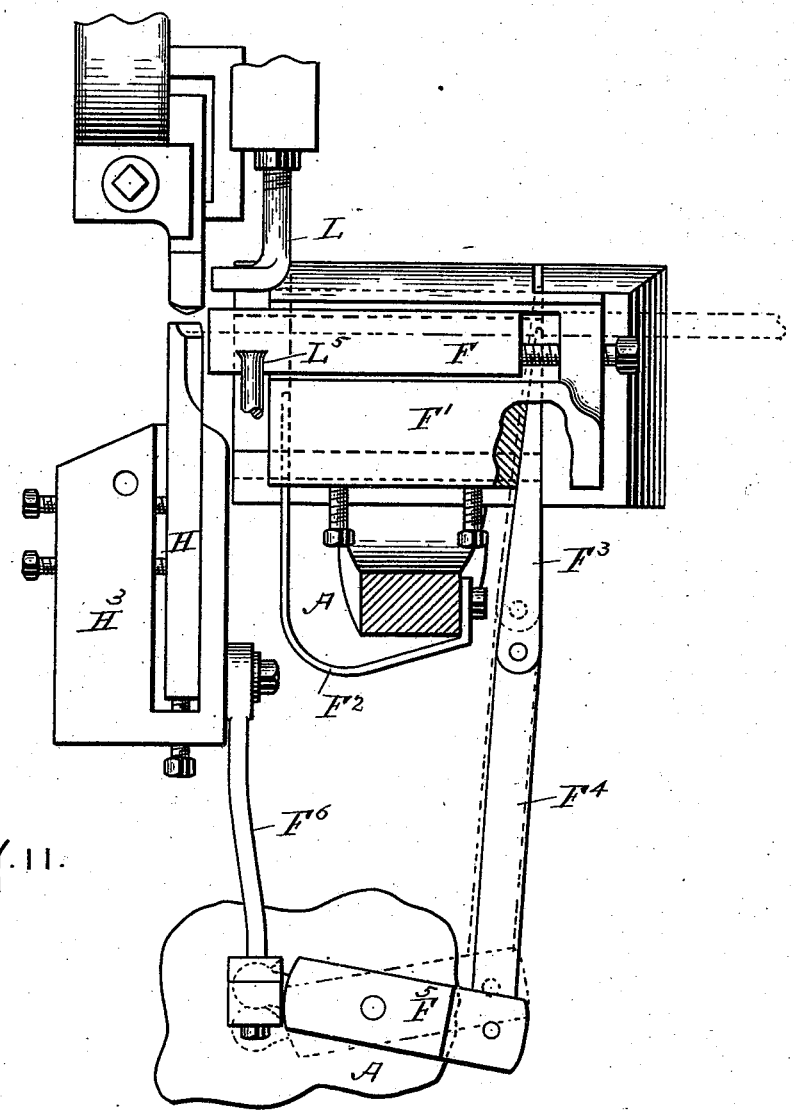
Figure 12:
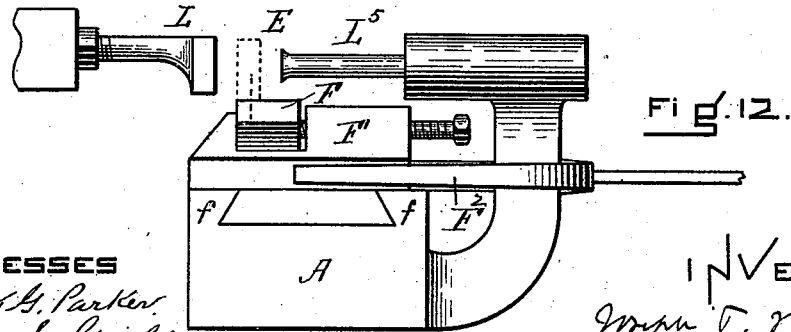

Figure 1 is a plan of a machine embodying my invention, Fig. 2 being a section on line $x\ x$ of Fig. 1, looking toward the right of the machine. Fig. 3 is a section taken on the line $y\ y$ of Fig. 1. Fig. 4 is a section taken on the line $x\ x$ of Fig. 1, looking toward the left. Fig. 5 is a detail showing the feeding mechanism. Fig. 6 is a detail showing the method of making the point of the toe-calk. Fig. 7 is a detail in perspective showing the location of the various parts which operate upon the rod to form the toe-calk, and Fig. 8 is a plan showing many of the parts shown in Fig. 7. Fig. 9 is a detail plan, partly in section, showing the rod in position to be forged; and Fig. 10 is a detail showing the mode of operation of the clamp which holds the rod. Figs. 11 and 12 show a modification of the anvil in plan and elevation.

The frame of my machine is indicated at A. This frame carries a main shaft B, on which is the pulley B', by means of which power is transmitted to the various parts of the machine. This main shaft also carries a gear $B^2$, meshing with the gear $B^3$ on the short shaft $B^4$, which also carries a gear $B^5$, meshing with the large gear $B^6$ on the cam-shaft C. The farther end of this cam-shaft carries a worm-gear C', meshing with the worm-gear D' on the counter-shaft D, this counter-shaft carrying at its farther end a fly-wheel $D^2$. F is the anvil, a plate supported on the frame A, upon which the blank lies during the construction of the toe-calk. The front face of this plate is shaped to give the proper shape to the back of the toe-calk point. The feeding mechanism will be described later.

The forging-dies are indicated at G and H. (See Fig. 7.) They are operated as follows: The die G is practically stationary during the manufacture of the toe-calk and supports the side of the blank while it is being struck by the movable die or hammer H. When the toe-calk is finished, the die G is moved back out of the way until the forging of a new blank is to begin. The die G is carried on a rocker-arm G', which is mounted on the stud $g$, its upper rear end carrying a cam-roll $g'$, which is operated by means of the cam $G^2$, the spring $g^2$ holding the roll down to its work. (See Fig. 3.) The shaft D, which carries this cam $G^2$, is timed in the machine shown to operate once for every five revolutions of the main shaft, so that the die G will be held close to the toe-calk blank while the hammer H makes five blows against the blank. This, however, is a matter of convenience, the machine as constructed being timed to forge the toe-calk in five movements, and the intention being to hold the die G in place until the work of the working die or hammer is finished. The movable die H is given a forward-and-back motion. It is mounted on a bell-crank $H^3$, hung on a stud $h'$. (See Fig. 3.) An eccentric H' with a suitable eccentric-strap $H^2$ carries a ball-and-socket joint $h$, attached to one end of this bell-crank $H^3$. The upper end of this bell-crank $H^3$ carries the die H. These parts are so arranged that with each revolution of the shaft the die H will be thrown against the point of the toe-calk, so as to forge its sides properly against the die G. The operation of these two parts is to squeeze that portion of the sides of the blank which is to form the point of the toe-calk, their work being indicated in Fig. 7.

The point is drawn down by the roll J, which is preferably mounted and operated in the following manner: This roll is axled in a tool-holder $J^2$, carried in a disk $J'$, mounted on the shaft B. This tool-holder is provided with shoulders $j'$, which set into the surface of the disk $J'$. (See Fig. 7.) The shank of the tool-holder passes through the disk and is threaded at its lower end, so that the tool-holder may be held in place by the nut $j$. (See Fig. 6.) This is merely one convenient way of so holding the tool-holder that it may be easily removed and another substituted at will. Moreover, by inserting washers between the bearing-surfaces of the tool-holder and the shoulder $j'$ the radius of motion of the tool may be adjusted.

It will be noticed that the axis of the disk $J'$ is below the blank-carrying anvil F and that the parts are so located (see Fig. 6) that the roll J, as it is brought round against the blank, will squeeze the front of the point against the face of the anvil, drawing it down during the process, so as to give it the desired shape. This is an important feature of my invention and is a marked improvement over other machines now known.

To trim the lower end of the point of the blank and thus insure a uniformity of product, a cutter $h^2$ is fastened to the movable die H. (See Fig. 7.)

K is a holder which grips the blank intermittently against the anvil F while the process of forging is going on. For this purpose the holder is reciprocated by means of a cam $K'$, mounted on the shaft D, the position of this cam being indicated in Figs. 1 and 3. The cam has mainly a plain cylindrical surface, but there are five small projections $k$ which give to the holder K the necessary outward movements to enable it to hold the rod E in place. This part K is suspended from the end of a lever $K^2$, pivoted on the frame at $K^3$ and carrying at its rear end a suitable cam-roll $k^2$, the spring $k^3$ being provided to keep the cam-roll at work.

It is evident that if the blank were held so that its point were in the position shown in Fig. 7 while the dies G H were doing their work a fin would be formed owing to the oozing out of the metal between the front face of the anvil F and the sides of the dies during the forging process. To remedy this, I move the blank and anvil with relation to each other so that the blank will be gripped fairly and fully by the dies without reference to the anvil F. This will be understood from Fig. 5, in which one form of this movement and the parts affecting it are indicated. These parts will now be described.

The carriage for holding the blank is indicated at Q. It slides on suitable ways W located near the front of the machine.

To the upper side of this carriage is secured, by suitable means, a heavy leaf-spring R. This spring has an upward projection $r$ and a downward projection $r'$, extending below the under surface of the carriage. A stud $r^2$ projects from the face of the part $r$ and carries a downwardly-extending clamp $r^3$, the stem of which passes through a hole in the stud $r^2$ and is held in place by a set-screw. (Not shown.) The clamp is so adjusted that when the parts are in their normal position (see Fig. 10) the rod E, the end of which forms the blank, will be gripped between the clamp and a projection $q$ on the carriage Q. The clamp is operated automatically by means described below.

The carriage is reciprocated by the following means, (see Figs. 2 and 5:) A connecting-rod $Q'$ lies between it and a rocker-arm $Q^2$, mounted on a rock-shaft $Q^3$. A cam-roll $Q^4$ is also mounted on this rocker-arm and receives its motion from the cam $Q^5$, mounted on the shaft C. $Q^6$ is a heavy spring mounted on a cross-bar $A'$ at the bottom of the frame A and bearing upon the rocker-arm $q^3$, also mounted on said rock-shaft. The spring $Q^6$ forces the carriage to feed the rod E forward as far as the face of the cam $Q^5$ will permit, its farthest position being that shown in Fig. 5. From time to time the projections $q^4$ on the cam will tend to withdraw it slightly, enough to bring the rear face of the point of the toe-calk against the front face of the anvil F, this position of the parts occurring as the roll J comes around to draw the point down; but the instant the roll J is out of the way, the cam-roll $Q^4$ having passed over the projection $q^4$, the other parts will return to their position shown in Fig. 5, and the dies G H will come together, the parts then being in the position shown in Fig. 8. The lever $Q^2$ has connected with it a spring $Q^8$, which bears against the inner side of a link $Q^7$, the other end of the link hooking onto the carriage Q. By means of this spring the connecting-rod $Q'$ is held in place between the carriage and the lever $Q^2$.

When the blank has remained forward long enough for the toe-calk to be completed, the cam $Q^5$ withdraws the carriage, so that the toe-calk is brought into position to be cut off by the cutters M N. In order that the carriage may be withdrawn, however, it is necessary that the downward-projecting point of the toe-calk be pushed off of one side of the anvil, so that it may be slipped by it. For this purpose I provide a finger V, (see Fig. 9,) which is pivoted in the frame at $v$, and is connected by a link $V'$ with the slide which forms part of the stationary die G, so that as this die is removed when its work is done it pulls the finger V with it, and as at this instant the holder K has released the rod E the point $e$ of the blank is pushed around the end of the anvil, so that the carriage may withdraw it.

The cutting mechanism M N is as follows: N is a stationary cutter which is suitably mounted in a clamp $N'$, supported on the frame. The rod normally slides against this cutter as a guide. The movable cutter M is mounted in a yoke M'. As shown, it is held in place by wedges $m$ and clamp $m'$. The yoke M' has a forward-and-back movement given it in ways on the frame by means of the cam $M^2$ acting through the cam-roll $M^3$, mounted on the rear end of the yoke M'. By this means the forward movement is given to the cutter, the rear movement being given by a spring. (Not shown.) A finger $n$, mounted on the clamp N', is provided, against which the cutter M pushes the calk during the cutting operation. This finger also causes the finished toe-calk to drop through the opening $n'$ onto the floor below.

For the purpose of keeping the point of the blank in the path of the roll J, I provide a pusher L, which receives a forward movement from the cam L'. It is mounted in a slide $L^2$, which carries the cam-roll $l$. $L^3$ is a rod which connects the slide with a spring $L^4$ to keep the cam-roll and cam in contact.

When the toe-calk has been cut off, the spring-clamp $r^3$ is operated in the following manner to allow the operator to feed the rod: Against the surface of the cam R' rides a cam-roll $r^4$, running in the end of a right-angled rocker-arm $r^5$, mounted on a stud $r^6$. This arm is connected with a toe $r^7$, also mounted on the stud $r^6$, so that the cam R' will control the motions of the toe $r^7$. These parts are so located and the cam is so timed that the instant the finished toe-calk is cut off the toe $r^7$ will rise, and, striking the projection $r'$ on the clamp, (see dotted lines, Fig. 10,) will lift the clamp for an instant against the force of the spring R, so as to release the rod E. The operator thus has opportunity to push the rod forward, when the cam R' releases the clamp $r^3$ and the clamp drops and clamps the rod again.

In putting the rod E into the machine the operator passes it first between the clamps $q$ and $r^3$. It is then pushed along through an eye T until it strikes a gate S, which forms a gage to determine the distance which the operator shall feed it. This gate is mounted on the end of a lever $s$, mounted on the rock-shaft $s'$. The short end $s^2$ of the lever is connected by a spring $s^3$ to a frame at $s^4$ to keep the gate open. This gate S is operated by means of the lug S' on the disk $S^2$, mounted on the shaft C, this lug coming in contact with the rocker-arm $s^5$ on the lower end of the rock-shaft $s'$.

$S^3$ is a stationary post against which the gate closes, and acts to prevent the operator from pushing the end of the rod past the gate. When the end of the rod reaches the gate, the operator's duty in feeding the rod ends. The rest of the work is done by the carriage, which pushes the end of the rod under the roll P and into its farthest position, to be acted upon by the dies. The gripper K now descends and grips the rod E against the anvil F, holding it there intermittently while the rod is being acted upon by the hammers or dies. The stationary die having moved forward, the movable die now moves forward and squeezes the end of the blank against the stationary die G. It then retires and the gripper K is lifted. The carriage now withdraws the rod E slightly, so that the rear of the part $e$ of the blank which has been squeezed between the dies G and H is brought against the front face of the anvil F. By this time the roll J has moved around so that it wipes down the portion $e$ of the blank and begins the formation of the point of the toe-calk. Just before the roll reaches the blank the pusher L moves out and pushes the blank so that the point $e$ will surely be in the path of the roll J. The roll having passed off the point, the carriage moves the blank slightly forward and the gripper K descends and bites the blank again, the dies come together and again squeeze the blank. This operation of alternate squeezing and rolling is continued until the blank has been treated, say, five times by the various parts, when the dies G H give it a final squeeze and the blank is finished, except that it must be cut off. The die H, pusher L, and gripper K are now withdrawn. The stationary hammer G is also withdrawn, and with it the part V is pulled so as to slide the point $e$ of the rod E off from the anvil. The carriage now starts back and the side of the point $e$ slides along the side of the anvil until the proper part of the blank lies between the cutters M N. The movable cutter now reciprocates, cutting off the finished toe-calk, which falls through the opening $n'$ onto the floor. At this instant the clamp-lifting mechanism operates to lift the clamp $r^3$, so that the operator can push the rod in against the gate S, which in the meantime has swung around and closed the rod-passage, and the instant the gate is touched by the end of the rod the gate swings back and the clamp descends, so that the rod is again clamped. The carriage now moves in and the above operations are again repeated.

The rod, of course, should be heated to a proper forging-heat before being inserted in the machine.

I have shown in Figs. 11 and 12 of the drawings another arrangement of the anvil. In these views the mechanism is such that instead of causing the blank to advance at the instant it is to receive the blow of the hammer H the anvil is caused to retreat at that instant, so that in either case the parts are caused to reciprocate with respect to each other. In these views the anvil F is moved by the following means: It is mounted in a sliding frame $F''$, which moves in ways $f$ on the frame A. It is held back by a stiff spring $F^2$, one end of which is fast to the frame A, and it is pushed forward against the force of the spring by a wedge $F^3$, which is introduced behind it. This wedge is connected by connecting-rod $F^4$ with one end of the lever $F^5$, pivoted to the frame A, the other end of this lever being connected by connecting-rod F⁶ to the bell-crank H³, which carries the hammer H. As the hammer moves forward the wedge F³ is withdrawn and the spring F² throws back the anvil, leaving the blank clear to receive the blow of the hammer. As the hammer retreats the wedge is pushed behind the anvil-frame and forces it forward. Only a slight movement of the anvil is necessary. In this case the part K is unnecessary, but I prefer to use a guide L⁵, fastened to the frame opposite to the pusher L, against which the rod E will be centered.

It is obvious that the movements of the various tools and working parts may be given to them by other means than those herein described. The more important operations of my machine are those whereby the point of the toe-calk is drawn down against the front edge of the anvil, as by the roll J, and the front edge of the anvil and the point of the toe-calk are then separated, so that the point will be free from the front face of the anvil at the instant when the point is to be squeezed between the dies. In this way the making of a fin is prevented. Moreover, I believe the use of a gate mechanism S which serves as a gage to insure the insertion of the rod to a proper distance and then moves out of the way to allow the rod to be fed is very desirable.

What I claim as my invention is—

1. In a machine for making toe-calks, in combination with a blank grip and feed, an anvil, a rotary die adapted to coöperate with said anvil to draw down the point of the toe-calk blank, a pair of squeezing-dies located one on each side of the end of the blank and slightly in front of the anvil and mechanism whereby the end of the blank is placed between said squeezing-dies just before the squeezing operation and it and the face of the anvil are brought into contact again immediately thereafter, all as set forth.

2. In a machine for making toe-calks, in combination with two squeezing-dies and means whereby one or both of them are reciprocated, a blank-holding mechanism, and mechanism for giving a slight reciprocating movement thereto while said dies are apart, whereby the blank is placed fairly between the dies, as and for the purposes set forth.

3. In a machine for making toe-calks, in combination with oscillating dies adapted to squeeze the sides of the point of the toe-calk, an anvil and a blank-gripping mechanism and means whereby said anvil and toe-calk are intermittently reciprocated with respect to each other, between each squeezing operation, all as set forth.

4. In a machine for making toe-calks, in combination with shaping-dies, an anvil and means whereby the blank is fed thereto and shaped, an intermittently-reciprocating blank-gripping mechanism of the kind described and mechanism whereby said blank is intermittently reciprocated during the intervals when it is released by said grip mechanism, all as set forth.

5. In a machine for making toe-calks, in combination with mechanism for forming the point of the toe-calk including an anvil and mechanism whereby said anvil and the blank are reciprocated with relation to each other, a reciprocating gripping mechanism adapted to alternately grip and release the blank, and a lateral pushing mechanism adapted to relocate the blank laterally upon the anvil, when it is released by said gripping mechanism, all as set forth.

6. In a machine for making toe-calks, in combination with the anvil and with suitable dies whereby the point of the toe-calk is shaped over the front corner thereof, a disengaging-finger adapted to be moved across the line of motion of the blank and disengage the point of the blank from the front corner of the anvil, and mechanism whereby the blank shall be withdrawn, all as and for the purposes set forth.

7. In a machine for making toe-calks, mechanism for withdrawing and cutting off the finished toe-calk, consisting of a pair of cutters located in the rear of the forming-dies and in front of the carriage, one on each side of the path of the blank, and mechanism for disengaging the point of the toe-calk from the edge of the anvil, in combination with a feeding-carriage and mechanism for withdrawing said carriage after the point of said blank has been released, all as and for the purposes set forth.

8. In a machine for making toe-calks, a rod-cutting mechanism consisting of a pair of cutters located one on each side of the path of the rod, and mechanism whereby one or both of them are reciprocated across the path of the blank rod, in combination with the finger n located forward of said cutters and adapted to support the pointed end of the toe-calk during the cutting operation, as set forth.

9. In a machine for making toe-calks, in combination with a reciprocating feed-carriage, an oscillating feed-gate and means whereby it is oscillated intermittently across the path of the blank when the feed-carriage is withdrawn, as and for the purposes set forth.

10. In a machine for making toe-calks, in combination with an oscillating feed-gate and a reciprocating carriage, the post S³ located in front of said gate and adapted with said gate to close the path of the blank rod, as and for the purposes set forth.

11. In a machine for making toe-calks, the reciprocating carriage above described having mechanism located thereon whereby the blank rod is held while the carriage is in its forward position and a releasing mechanism adapted to operate when said carriage is in its rearward position, in combination with mechanism whereby said carriage is reciprocated between its extreme positions and also is given a series of short reciprocations while in its forward position, all as set forth.

12. In a machine for making toe-calks having a reciprocating carriage adapted to hold the blank rod, an anvil and mechanism for forming the toe-calk over the edge of the anvil, a cutting mechanism located in rear of the anvil and mechanism for moving the toe-calk laterally to clear the edge of the anvil whereby the carriage carrying the toe-calk may withdraw it to a point between the cutters, as set forth.

In testimony whereof I have hereunto set my hand this 28th day of February, 1895.

JOSEPH T. VARNEY.

Witnesses:
GEORGE O. G. COALE,
EVA A. GUILD.